(12) United States Patent
Baldée et al.

(10) Patent No.: US 10,611,620 B2
(45) Date of Patent: Apr. 7, 2020

(54) DOSING PUMP DEVICE FOR DOSING METERED AMOUNTS OF A LIQUID PRODUCT

(71) Applicant: Koninklijke Douwe Egbers B.V., Utrecht (NL)

(72) Inventors: Jaap Willem Baldée, Utrecht (NL); Michiel Mooibroek, Utrecht (NL)

(73) Assignee: Koninklijke Douwe Egberts B.V., Utrecht (NL)

(*) Notice: Subject to any disclaimer, the term of this patent is extended or adjusted under 35 U.S.C. 154(b) by 226 days.

(21) Appl. No.: 15/621,758

(22) Filed: Jun. 13, 2017

(65) Prior Publication Data

US 2017/0349422 A1 Dec. 7, 2017

Related U.S. Application Data

(63) Continuation of application No. PCT/NL2015/050864, filed on Dec. 14, 2015.

(30) Foreign Application Priority Data

Dec. 15, 2014 (NL) ...................................... 2013984

(51) Int. Cl.
*B67D 1/00* (2006.01)
*A47J 31/40* (2006.01)
(Continued)

(52) U.S. Cl.
CPC .......... *B67D 1/0079* (2013.01); *A47J 31/402* (2013.01); *A47J 31/407* (2013.01); *A47J 31/41* (2013.01);
(Continued)

(58) Field of Classification Search
CPC ............ B67D 1/0079; B67D 2001/075; B67D 2001/082; B67D 1/0031; B67D 1/0809;
(Continued)

(56) References Cited

U.S. PATENT DOCUMENTS 3,682,090 A 8/1972 Meriggi
3,884,391 A * 5/1975 Pauliukonis ............. B67D 3/00
222/129.4

(Continued)

FOREIGN PATENT DOCUMENTS

CH 675312 A5 9/1990
CN 101835414 A 9/2010
(Continued)

OTHER PUBLICATIONS

International Search Report and Written Opinion, PCT/NL2015/050864, 10 pages (dated May 9, 2016).

(Continued)

*Primary Examiner* — Atif H Chaudry
(74) *Attorney, Agent, or Firm* — Foley & Lardner LLP

(57) ABSTRACT

A dosing pump for dosing metered amounts of liquid product, includes an inlet adapted to be fluidly connected to a storage container, an output adapted to be connected to a beverage dispensing machine for receiving metered amounts of liquid product, and a dosing chamber arranged for transferring a liquid from the inlet to the output. The dosing chamber is at least partly filled with a liquid different from the liquid product. The different liquid can be a cleaning fluid, or be food compliant. The dosing pump can be included in an exchangeable supply pack filled with the liquid product for connecting to a beverage dispensing machine, and the output can be adapted to be brought into fluid connection with a beverage dispensing machine. When associated with a beverage dispensing machine, the dosing pump can be operated to allow the different fluid to be pumped through the beverage dispensing machine prior to a first dosing cycle of liquid product.

24 Claims, 3 Drawing Sheets

(51) Int. Cl.
*A47J 31/41* (2006.01)
*B67D 1/08* (2006.01)
*A47J 31/46* (2006.01)
*A47J 31/60* (2006.01)
*B67D 1/07* (2006.01)
*B67D 1/10* (2006.01)

(52) U.S. Cl.
CPC ............ *A47J 31/462* (2013.01); *A47J 31/467* (2013.01); *A47J 31/60* (2013.01); *B67D 1/0031* (2013.01); *B67D 1/0037* (2013.01); *B67D 1/0078* (2013.01); *B67D 1/07* (2013.01); *B67D 1/0809* (2013.01); *B67D 1/10* (2013.01); *B67D 2001/075* (2013.01); *B67D 2001/082* (2013.01)

(58) Field of Classification Search
CPC ........ B67D 1/0037; B67D 1/07; A47J 31/407; A47J 31/462; A47J 31/467; A47J 31/41
See application file for complete search history.

(56) References Cited

U.S. PATENT DOCUMENTS

| | | | |
|---|---|---|---|
| 4,015,749 | A | 4/1977 | Arzberger et al. |
| 4,947,738 | A | 8/1990 | Eugster |
| 7,178,452 | B2 | 2/2007 | Fischer |
| 8,444,016 | B2 | 5/2013 | Lussi |
| 8,646,380 | B2 | 2/2014 | Mueller |
| 9,095,154 | B2 | 8/2015 | Anliker et al. |
| 9,746,087 | B2 | 8/2017 | Yokoe et al. |
| 2004/0227123 | A1 | 11/2004 | Rodgers et al. |
| 2007/0272317 | A1* | 11/2007 | Klopfenstein ........ B01F 5/0648 137/889 |
| 2008/0029541 | A1* | 2/2008 | Wallace .............. B01F 13/1055 222/129.3 |
| 2009/0108224 | A1 | 4/2009 | Clasen et al. |
| 2009/0145926 | A1* | 6/2009 | Klopfenstein ........ B01F 5/0413 222/129.4 |
| 2009/0214742 | A1 | 8/2009 | Peden et al. |
| 2010/0126354 | A1 | 5/2010 | Mahlich |
| 2010/0162901 | A1 | 7/2010 | Mahlich |
| 2010/0176155 | A1* | 7/2010 | Baron .................. B67D 1/0079 222/129.1 |
| 2010/0193544 | A1* | 8/2010 | Rusch ...................... B67B 7/28 222/82 |
| 2012/0161046 | A1 | 6/2012 | Tsai |
| 2015/0157166 | A1 | 6/2015 | Van Os et al. |

FOREIGN PATENT DOCUMENTS

| | | |
|---|---|---|
| DE | 21 60 501 A1 | 6/1973 |
| DE | 42 35 262 A1 | 4/1994 |
| DE | 44 27 745 A1 | 2/1996 |
| DE | 19503618 C1 | 8/1996 |
| DE | 20 2008 007 131 U1 | 10/2009 |
| EP | 0 307 497 A1 | 3/1989 |
| EP | 361183 A1 | 4/1990 |
| EP | 0 409 305 A2 | 1/1991 |
| EP | 2 011 421 A1 | 1/2009 |
| EP | 2 030 538 A2 | 3/2009 |
| WO | WO-85/05167 A1 | 11/1985 |
| WO | WO-00/45073 A1 | 8/2000 |
| WO | WO-02/100224 A2 | 12/2002 |
| WO | WO-2007/120045 A2 | 10/2007 |
| WO | WO-2008/143505 A1 | 11/2008 |
| WO | WO-2008/147195 A1 | 12/2008 |
| WO | WO-2009/018672 A1 | 2/2009 |
| WO | WO-2011/037464 A1 | 3/2011 |
| WO | WO-2014/003570 A2 | 1/2014 |
| WO | WO-2014/081037 A1 | 5/2014 |

OTHER PUBLICATIONS

Translation of Chinese Office Action and Search Report, App. No. 2015800753051 (dated Feb. 25, 2019).

* cited by examiner

DOSING PUMP DEVICE FOR DOSING METERED AMOUNTS OF A LIQUID PRODUCT

CROSS-REFERENCE TO RELATED APPLICATIONS

This application is a continuation of PCT/NL2015/050864, filed Dec. 14, 2015, which claims the benefit of and priority to Netherlands Application No. NL 2013984, filed Dec. 15, 2014; the entire contents of all of which are incorporated herein by reference.

BACKGROUND

The invention relates to a dosing pump device for dosing metered amounts of a liquid product to a beverage machine. More in particular the invention relates to a dosing pump that does neither need to be self-priming, nor requires any purging of air or gasses to effect priming.

It is generally known for pumps to be self-priming, or to be purged prior to a pumping operation. When pumps are used for metering accurate amount, especially in the preparation of beverages that are suitable for human consumption, pump priming becomes very critical. Accuracy and reproducibility of the dosing of ingredients can easily become compromised by air pockets existing in a pump housing, or by delays in the delivery of fluids from the pump. The smaller the amount to be dosed per cycle, the more serious any deviations from proper metering will work out in a beverage resulting from that cycle.

SUMMARY

Accordingly it is an object of the present invention to propose an improved dosing pump device. In a more general sense it is thus an object of the invention to overcome or reduce at least one of the disadvantages of the prior art. It is also an object of the present invention to provide alternative solutions which are less cumbersome in assembly and operation and which moreover can be made relatively inexpensively. Alternatively it is an object of the invention to at least provide a useful alternative.

To this end the invention provides a dosing pump for dosing metered amounts of liquid product, the dosing pump including an inlet adapted to be fluidly connected to a storage container, an output adapted to be connected to a beverage dispensing machine for receiving metered amounts of liquid product, and a dosing chamber arranged for transferring a liquid from the inlet to the output, wherein the dosing chamber is at least partly filled with a liquid different from the liquid product. Pre-filling the dosing device or pump with a liquid different from the liquid product to be metered thereby eliminates any additional effort in pump priming and ensures accurate metering from the first beverage preparing cycle on.

Optionally, the different liquid in the dosing pump can be a cleaning fluid or water. When the different liquid is a cleaning fluid it can be alkaline and/or it can contain a mixture of alcaic components. The cleaning fluid can optionally also contain active chlorine. Again optionally the cleaning fluid contains an anti-scaling agent. Advantageously the cleaning fluid is water soluble, so that it can be rinsed or be compatible with other liquids passing the dosing pump. Also the cleaning fluid is advantageously residue-free, so that food compatibility is ensured after cleaning. To ensure effective cleaning the cleaning fluid may optionally have a pH within a range of 2 to 12, and more preferably have a pH of 7 to 12. Optionally, and preferably depending on the materials in the fluid tract of the beverage machine, the cleaning fluid may be selected to be non-corrosive. The cleaning fluid may optionally be preferred to contain only organic acids.

Alternatively the different liquid can be selected to be food compliant. With such a different liquid it becomes possible to rinse or flush any remnants or residues with the liquid product that is to be metered after the different liquid has vacated the dosing pump and/or liquid tract of the beverage machine.

Optionally when the dosing chamber includes a pump chamber, the pump chamber can be filled entirely with the different fluid, or all of the dosing chamber can be filled entirely with the different fluid. In particular when the different fluid is a cleaning fluid, it can be advantageous to have a possibly large amount of fluid available for a cleaning cycle.

The invention is also relevant to an exchangeable supply pack filled with the liquid product, such as a beverage concentrate, for connecting to a beverage dispensing machine, that includes the above referred to dosing pump, and that has the output adapted to be brought into fluid connection with a beverage dispensing machine. The liquid product, when a beverage concentrate, may be one of a coffee concentrate, a cocoa concentrate, a tea concentrate, or a milk concentrate. With the different liquid being a cleaning fluid it then becomes possible to have an automatic cleaning cycle with every exchange of a supply pack. Optionally a seal that is adapted to be broached can then be employed to close the inlet of the dosing pump to thereby prevent the liquid product from entering the dosing chamber and mixing with the different liquid. Mixing of the liquid product and the different liquid can occur during transport and handling, and may be objectionable in regard of food safety compliance. The output of the dosing pump may optionally be closed by a valve, which is arranged to be opened by fluid pressure generated by the dosing pump when driven by the beverage dispensing machine. Alternatively the optional valve in the output of the dosing pump can also be arranged to be opened and closed by a beverage dispensing machine in a different manner, when the supply pack is connected thereto. Such an arrangement eliminates the need for manually removable caps or seals.

According to a further aspect of the invention a method of operating the dosing pump, when in use it is associated with a beverage dispensing machine, includes the steps of: allowing the different fluid to be pumped through the beverage dispensing machine prior to a first dosing cycle of liquid product; and flushing out the different fluid following pumping of the different fluid, but prior to the first dosing cycle of liquid product. Such a method may be advantageous when the different liquid is not food compliant, and when there is a risk that remnants may contaminate the liquid product. Optionally, when in use the dosing pump is further associated with a supply pack, the first dosing cycle of liquid product can be preceded by broaching of a seal that is initially closing the inlet of the dosing pump. In that case it would be advantageous when the step of flushing out precedes the step of broaching the seal, and further when flushing out also includes flushing out the dosing chamber. Also advantageously flushing out is performed with heated, potable water. Beverage dispensing machines for hot beverages, such as coffee, chocolate drinks, soup, or tea usually have a water heater. Using the same water heater for rinsing and flushing will greatly enhance the removal of deposits, and depending on temperature can also provide sterilizing.

BRIEF DESCRIPTION OF THE DRAWINGS

Further advantageous aspects of the invention will become clear from the appended description and in reference to the accompanying drawings, in which.

DETAILED DESCRIPTION

Figure 1:
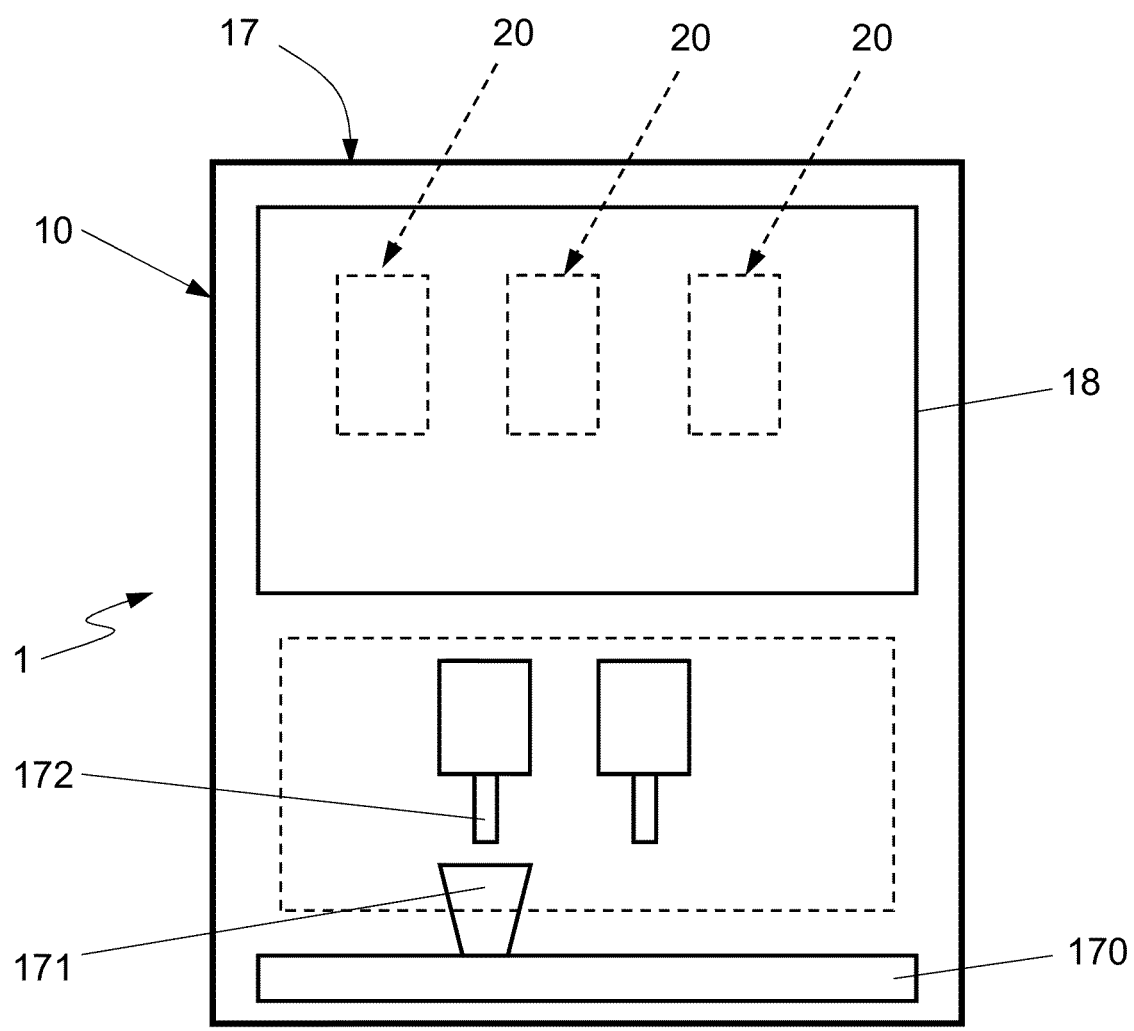
FIG. 1 schematically shows a beverage dispensing system as part of the invention.

Referring to FIG. 1 a schematically illustrated beverage dispensing system 1 comprises a beverage dispensing machine 10. The beverage dispensing machine 10 has a housing 17 with a support tray 170. On the support tray 170 can be supported a beverage receptacle 171, such as a cup or mug to receive the dispensed beverage from a beverage outlet 172 on the machine 10. The housing 17 of the beverage machine 10 is further provided with a front operating panel 18, behind which one or more exchangeable supply packs 20 may be accommodated. Three such exchangeable supply packs 20 are indicated in dashed lines in FIG. 1. Each of the supply packs 20 can contain a liquid product or ingredient that is useful in the preparation of a beverage. The beverage machine 10 may further be provided with a water supply, a heater and/or a mixing chamber (not shown).

Figure 2A:
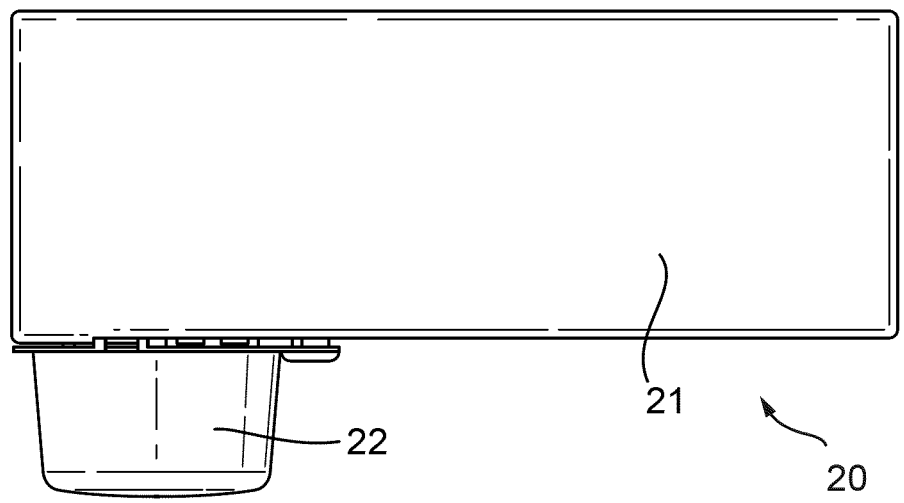
FIGS. 2A and 2B illustrate an exchangeable supply pack of the invention.
Figure 2B:
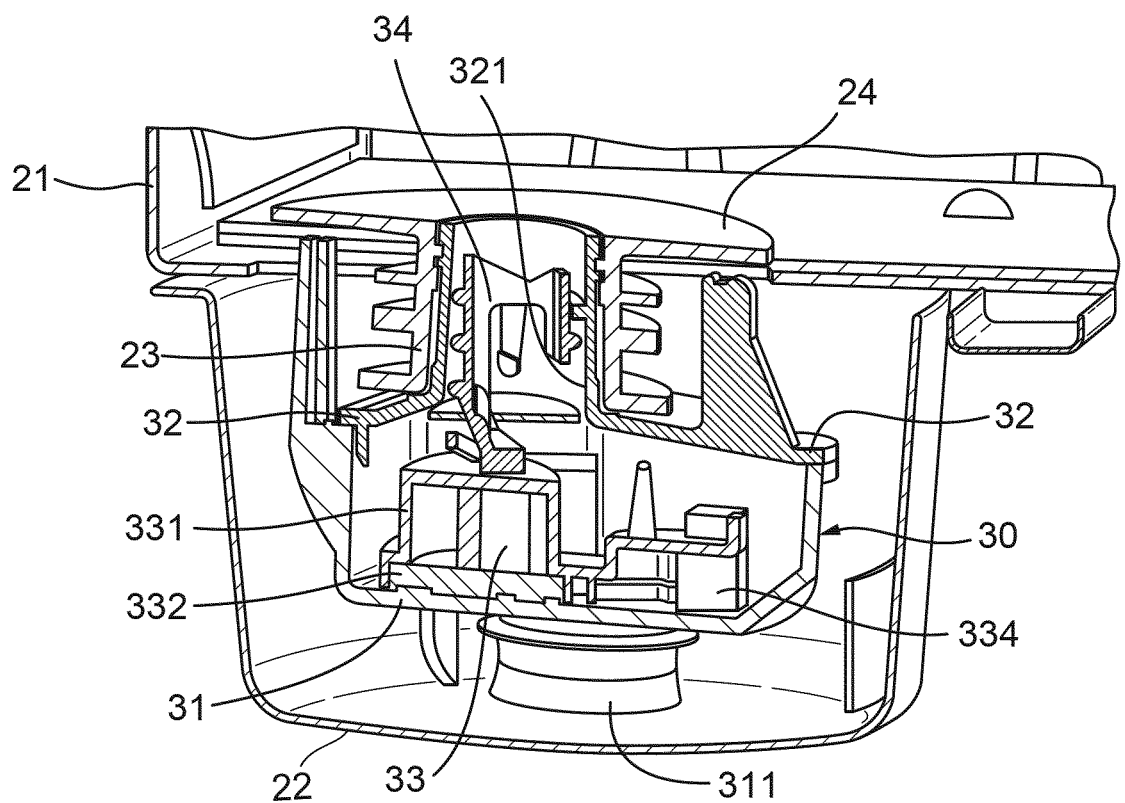

FIGS. 2A and 2B show a supply pack 20 suitable for insertion into and for being accommodated within the beverage dispensing machine 10 of FIG. 1. As shown in FIG. 2A the supply pack 20 comprises a container 21 and a removable protective cap 22. As shown in the enlarged partially cross sectioned detail of FIG. 2B the removable protective cap 22 hides a doser 30, which is permanently attached to the container 21 in fluid connection with a container outlet spout 23. The outlet spout 23 is attached to the container 21 by a container outlet flange 24. When the container 21 is of a bag-in-box type, the container outlet flange 24 is additionally fluid tight connected to a flexible bag inside the container 21. Such arrangements are conventional and well known to the skilled person. In particular a flexible pierceable foil seat (not shown) may be attached over the outlet flange 24 to initially close the container outlet spout 23, so as to keep any liquid product within the container 21.

The doser 30 has a housing that is composed of a lower housing part 31 and an upper lid 32. The lid 32 is provided with a doser inlet 321, and the lower housing part 31 is provided with a doser output 311. Within the doser housing 31, 32 is a pump 33 is located. The pump 33 has a pump housing 331 and a bottom seal plate 332. Located within the doser inlet 321 is a broaching piercer 34 for broaching the pierceable foil seal (not shown, but discussed above) of the container 21.

The doser output 311, after removal of the protective cap 22 is arranged to be fluidly connected to the beverage dispensing machine 10 of FIG. 1. To this end, as further shown in the exploded arrangement of FIG. 3, the doser output 311 includes a flexible and resilient output spout 3113 for sealing by engaging a mixing chamber in the dispensing machine 10. Also part of the doser output 311 is a valve 3115, which closes or opens the doser output 311, when operated directly or indirectly by the dispensing machine 10.

In the present example the valve 3115 is opened indirectly by fluid pressure generated by the pump 33, when driven by the beverage dispensing machine 10.

Figure 3:
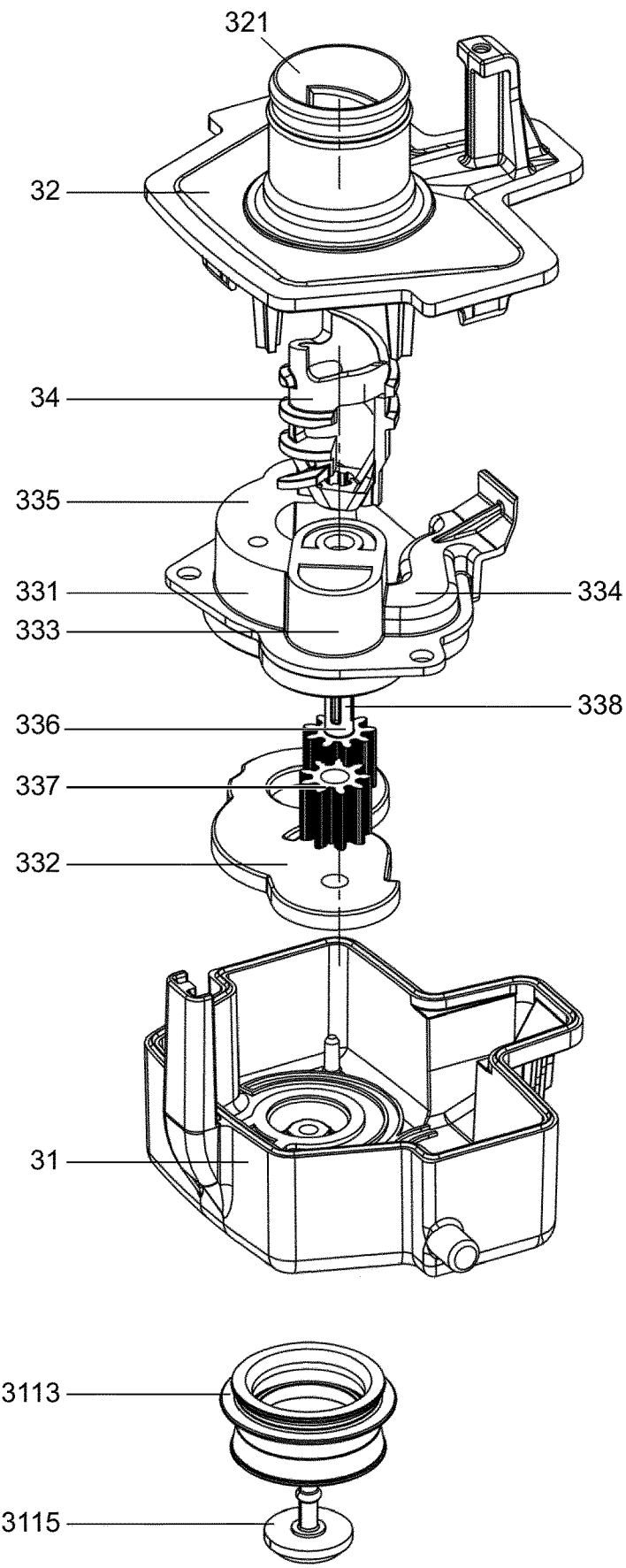
FIG. 3 is an exploded view of a doser of the invention.

As further illustrated in FIG. 3 the pomp housing 331 includes a pump chamber 333 with a pump inlet channel 334 and a pump outlet channel 335. Within the pump chamber 333 are accommodated a driving pump gear 336 and a driving pump gear 337. A drive shaft 338 extends actually through the driving gear 336. A lower end of the drive shaft 338 extends through a bottom of the lower housing part 31 to be driven, in use, by the dispensing machine 10. An upper end of the drive shaft 338 extends upwardly through the pump housing 331 for driving the broaching piercer 34.

The doser, or dosing pump 30 is thus arranged for dosing metered amounts of liquid product from the storage container 21 of the supply pack with which it is associated. The thus metered amounts of liquid product are received by the beverage dispensing or beverage preparing machine 10. A dosing chamber is thereby defined with the interior formed by the lower housing part 31 and the upper lid 32. Within the dosing chamber 31, 32 is accommodated the pump chamber 333, which has a smaller volume than the dosing chamber. According to the invention part of the volume of the dosing chamber 31, 32 is filled with a liquid different from the liquid product which is to be metered from the supply pack. When the supply pack 20 is still new, its outlet spout 23 is still closed by a foil seal, which keeps the liquid product within the container 21 completely separated from the different liquid in the dosing chamber 31, 32. With such a filling of a different liquid the pump 33 does not have to be self priming. Moreover when the different liquid is a cleaning fluid there is an initial cleaning cycle of the beverage machine 10, every time a new supply pack 20 is installed. After initial rotation of the pump gears 336 and 337 within the pump chamber 333 the cleaning fluid is distributed through the beverage machine 10. When the cleaning fluid is food compliant, a broaching cycle to pierce the seal between the container 21 and the dosing pump, or doser 30, can start simultaneously with the cleaning fluid being expelled from the dosing chamber and pump 33.

It is however also conceivable that there is an additional rinsing cycle before the broaching piercer 34 is enabled to pierce the foil seal of the container 21. When flushing out any remnants of the cleaning fluid in a rinsing cycle, the selection of cleaning fluids is not limited to those that are food compliant.

Suitable ingredients for cleaning fluids include alkaline components, active chlorine, anti-scaling agents and organic acids. It is also advantageous when such cleaning fluids are water soluble, are residue-free, have a pH within a range of 2 to 12, preferably of 7 to 12, or are non-corrosive.

In a rinsing cycle it is also conceivable that the dosing chamber is flushed as well with potable water from the beverage machine 10. Advantageously the flushing water from the beverage machine 10 is heated by the water heater present in the beverage machine.

Accordingly a dosing pump 30 is disclosed for dosing metered amounts of liquid product. This dosing pump 30 includes an inlet 321 adapted to be fluidly connected to a storage container 20, an output 311 adapted to be connected to a beverage dispensing machine 10 for receiving metered amounts of liquid product, and a dosing chamber 31, 32 arranged for transferring a liquid from the inlet 321 to the output 311. The dosing chamber 31, 32 is at least partly filled with a liquid different from the liquid product. The different liquid can be water, a cleaning fluid, and/or be food compliant. The dosing pump can 30 be included in an exchangeable supply pack 20 filled with the liquid product for connecting to a beverage dispensing machine 10, and the output 311 can be adapted to be brought into fluid connection with a beverage dispensing machine 10. When associated with a beverage dispensing machine 10, the dosing pump 30 can be operated to allow the different fluid to be pumped through the beverage dispensing machine 10 prior to a first dosing cycle of liquid product.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extent that structure, material, or acts are considered to be essential they are inexpressively indicated as such. Additions, deletions, and modifications within the purview of the skilled person may generally be made without departing from the scope of the invention, as determined by the claims.

The invention claimed is:

1. An exchangeable supply pack filled with a liquid product for removably connecting to a beverage dispensing machine, the exchangeable supply pack comprising:
   a storage container containing a first liquid;
   a dosing pump including an inlet adapted to be fluidly connected to the storage container, an output adapted to be connected to the beverage dispensing machine for receiving metered amounts of the first liquid, and a dosing chamber arranged for transferring liquid from the inlet to the output, wherein the dosing chamber is initially at least partly filled with a second liquid different from the first liquid;
   wherein the output of the dosing pump is adapted to be brought into fluid connection with the beverage dispensing machine;
   wherein the exchangeable supply pack, comprising the storage container and the dosing pump, is configured to be installed and removed as a single unit relative to the beverage dispensing machine.

2. The exchangeable supply pack of claim 1, wherein the second liquid is water soluble.

3. The exchangeable supply pack of claim 2, wherein the cleaning fluid contains an anti-scaling agent.

4. The exchangeable supply pack of claim 1, wherein the second liquid is a cleaning fluid.

5. The exchangeable supply pack of claim 1, wherein the second liquid is food compliant.

6. The exchangeable supply pack of claim 1, wherein the dosing chamber includes a pump chamber, and wherein the pump chamber is filled entirely with the second liquid.

7. The exchangeable supply pack of claim 1, wherein the dosing chamber is filled entirely with the second fluid.

8. The exchangeable supply pack of claim 7, wherein the output of the dosing pump is closed by a valve.

9. The exchangeable supply pack of claim 8, wherein the valve is arranged to be opened and closed by a beverage dispensing machine when the supply pack is connected thereto.

10. The exchangeable supply pack of claim 9, wherein the valve is arranged to be opened by pressure of the second liquid, when the dosing pump is driven by the beverage dispensing machine.

11. The exchangeable supply pack of claim 1, further comprising a seal separating the first liquid in the storage container from the second liquid in the dosing chamber, the seal being configured to be pierced so that the first liquid can enter the dosing chamber.

12. The exchangeable supply pack of claim 1, wherein the output of the dosing pump is closed by a valve, which is arranged to be opened and closed by a beverage dispensing machine when the supply pack is connected thereto.

13. The exchangeable supply pack of claim 12, wherein the valve is arranged to be opened by pressure of the second liquid, when the dosing pump is driven by the beverage dispensing machine.

14. The exchangeable supply pack of claim 1, wherein the second fluid is acidic.

15. The exchangeable supply pack of claim 1, wherein the second liquid is water.

16. A method of dispensing liquid from an exchangeable supply pack to a beverage dispensing machine, the method comprising:
   providing an exchangeable supply pack having a storage container and a dosing pump, the storage container containing a first liquid, the dosing pump including an inlet fluidly connected to the storage container, an output configured to be connected to the beverage dispensing machine for receiving metered amounts of the first liquid, and a dosing chamber for transferring a liquid from the inlet to the output, wherein the dosing chamber is at least partly filled with a second liquid that is different from the first liquid;
   installing the exchangeable supply pack comprising the storage container and dosing pump into the beverage dispensing machine as a single unit;
   pumping the second fluid through the beverage dispensing machine, then
   initiating a first dosing cycle of the first liquid;
   removing the exchangeable supply pack comprising the storage container and dosing pump from the beverage dispensing machine as a single unit.

17. The method of claim 16, further including a step of flushing out the second fluid following pumping of the second fluid, but prior to the first dosing cycle of the first liquid.

18. The method of claim 17, and wherein flushing out includes flushing out the dosing chamber.

19. The method of claim 17, wherein flushing out is performed with heated, potable water.

20. The method of claim 16, wherein when in use the dosing pump is further associated with a supply pack, the first dosing cycle of the first liquid is preceded by broaching of a seal closing the inlet of the dosing pump.

21. The method of claim 20, wherein the step of flushing out precedes the step of broaching the seal.

22. The method of claim 16, wherein the step of initiating the first dosing cycle of the first liquid is performed without priming the dosing pump with the first liquid.

23. An exchangeable supply pack for connecting to a beverage dispensing machine, the supply pack comprising:
a storage container comprising a first liquid;
a dosing pump for dosing metered amounts of the first liquid, the dosing pump coupled to the storage container and including an inlet adapted to be fluidly connected to the storage container, an output configured to receive metered amounts of the first liquid, and a dosing chamber to transfer first liquid from the inlet to the output;
wherein the output of the dosing pump is configured to be brought into fluid connection with the beverage dispensing machine;
wherein the dosing chamber is initially at least partly filled with a second liquid, wherein the second liquid is different from the first liquid and is pumped out of the dosing chamber prior to any metered amounts of the first liquid are dosed to the beverage dispensing machine; and
wherein the exchangeable supply pack comprising the storage container and the dosing pump is configured to be installed as a single unit into and removed as a single unit from the beverage dispensing machine.

24. The exchangeable supply pack of claim 23, wherein the exchangeable supply pack has an uninstalled position in which the exchangeable supply pack is removed from the beverage dispensing machine, and wherein the exchangeable supply pack has an installed position in which the exchangeable supply pack is coupled to the beverage dispensing machine and the output of the dosing pump is in fluid communication with the beverage dispensing machine.

* * * * *